United States Patent Office 3,718,372
Patented Feb. 27, 1973

3,718,372
DOUBLE CIRCUIT BRAKE ARRANGEMENT FOR TRUCKS FOR DRAWING TRAILERS BRAKED BY PRESSURIZED AIR
Hans Gruner and Heinz Nicolay, Heidelberg, Germany, assignors to Graubremse G.m.b.H., Heidelberg, Germany
Filed Mar. 12, 1971, Ser. No. 123,627
Claims priority, application Germany, Mar. 14, 1970, P 20 12 204.7
Int. Cl. B60t 7/20, 13/36
U.S. Cl. 303—7      7 Claims

ABSTRACT OF THE DISCLOSURE

A two-circuit brake arrangement for trucks for drawing of trailers braked by pressurized air, which comprises two brake circuits, and a common pressure safety relay. The two brake circuits are connected with the common pressure safety relay. A common housing is provided and two oppositely operating step piston arrangements are disposed in the common housing. The step piston arrangements have cylinders. A central valve chamber includes a connection for a brake conduit for a trailer. The cylinders extend into the central valve chamber. The step pistons are hollow. One of the step pistons has an inlet seat and the other of the step pistons has an outlet seat within the range of the valve chamber for a spring biased double valve body. The double valve body closes the inlet seat. The step piston carrying the inlet seat defines inner spaces, and the inner space of the step piston carries the inlet seat in communication with a storage air connection. The inner space of the other step piston is in open communication with an airing connection. The cylinders receive the great part of the step piston carrying each a brake circuit connection on the outside of the pistons and are in communication on the other side with the valve chamber by means of a passage. Another spring-biased valve separates the part of the valve chamber receiving the double valve body and the brake conduit connection from the part of the valve chamber terminates the passages leading to the cylinders.

The present invention relates to a two-circuit brake arrangement for trucks for drawing of trailers by pressurized air brakes. In order to bring about a faster response of the trailer bakes, in particular in case of heavy trucks, pressure safety relays for two-conduits brakes have been provided therein. These relay valves form in combination with the pressure control valve (overflow valve) simultaneously a pressure safety upon separation of the trailer or upon becoming defective of the storage- or brake-conduits between the trailer and the truck.

The known devices are controlled in one circuit, whereby the same device is used for two-circuit brake arrangements. For the two-circuit control of the known relays two-way valves are provided, which make it possible, to operate both brake-circuits of the truck by means of the two-way valve, which makes it possible to operate the pressure control valve with those brake circuits of the truck by means of the two-way valve. Such arrangements have the drawback, that in case the arrangement is operative, the two-way valve closes during operation one side and remains in resting position, so that upon rendering inoperative one circuit, the two-way valve is likewise defective and the possibility exists, that thereby the pressure safety relay can no more be controlled.

It is one object of the present invention, to remove the drawbacks and to provide a two-circuit brake arrangement for trucks for drawing of trailers by pressurized air brakes, which operate without disturbance, whereby all parts are in movement in case the arrangement is in operative condition so that the above-stated inoperativeness cannot occur.

It is another object of the present invention to provide a two-way circuit brake arrangement for drawing trailers by pressurized air brakes, wherein the two brake circuits are connected with a common pressure safety relay which has in a joint housing two oppositely operating step piston arrangements, the cylinders of which extend into a central valve chamber with the connection for the trailer brake conduit, whereby the step pistons are hollow and within the range of the valve chamber one has an inlet seat and the other has an outlet seat for a double valve body, which, under the effect of a spring, closes the inlet seat and wherein the inner space of the step piston carrying the inlet valve is in connection with the storage air connection and the inner space of the other step piston is connected with an airing member in open connection and that furthermore the cylinders receiving the large part of the step piston carry on the piston outside each a brake circuit connection, and are connected on the other side by means of a passage with a valve chamber, whereby the part receiving the double valve body and the brake conduit connection of the valve chamber from that part, in which the passages terminate which lead to the cylinder, is separated by a spring biased passage valve. By this formation of the pressure safety relay simultaneouly a structure closed in itself is secured whereby all parts, important for the operation, are provided in a single housing, which simplifies the assembly of the arrangement.

Preferably, the spring engaging the passage valve is controllable, as to its tension, for the setting of the pressure advance for the trailer braking from the outside. The step piston carrying the inlet valve, has in its piston part projecting into the valve chamber a further set off, which is disposed in a ring chamber, in communication with an air storage connection by means of a conduit. In the connection conduit between the ring chamber and the storage connection is inserted an operating valve and a spring storage is connected. Upon omission of a spring storage cylinder, the connection conduit between the ring chamber and the storage connection is formed by a bore passing through the inner wall of the step piston.

Of particular advantage is the arrangement, in case the step pistons are made of two parts, whereby the large piston part guide leads sealingly in addition to its cylindrical chamber on the inner hollow piston part and between both piston parts, abutments, joining members or the like, effective only towards one side, are provided such, that the large piston part in case of engagement of pressurized air joins forcibly the hollow piston to the valve chamber.

Finally, a mechanical operating device can still be provided, to be connected to hand braking rods, for, and in particular preferably for the step piston carrying the outlet valve.

With these and other objects in view the present invention will become apparent in the following detailed description, the present invention which is shown by example only, will be clearly understood in connection with the accompanying drawings, in which.

Figure 1:
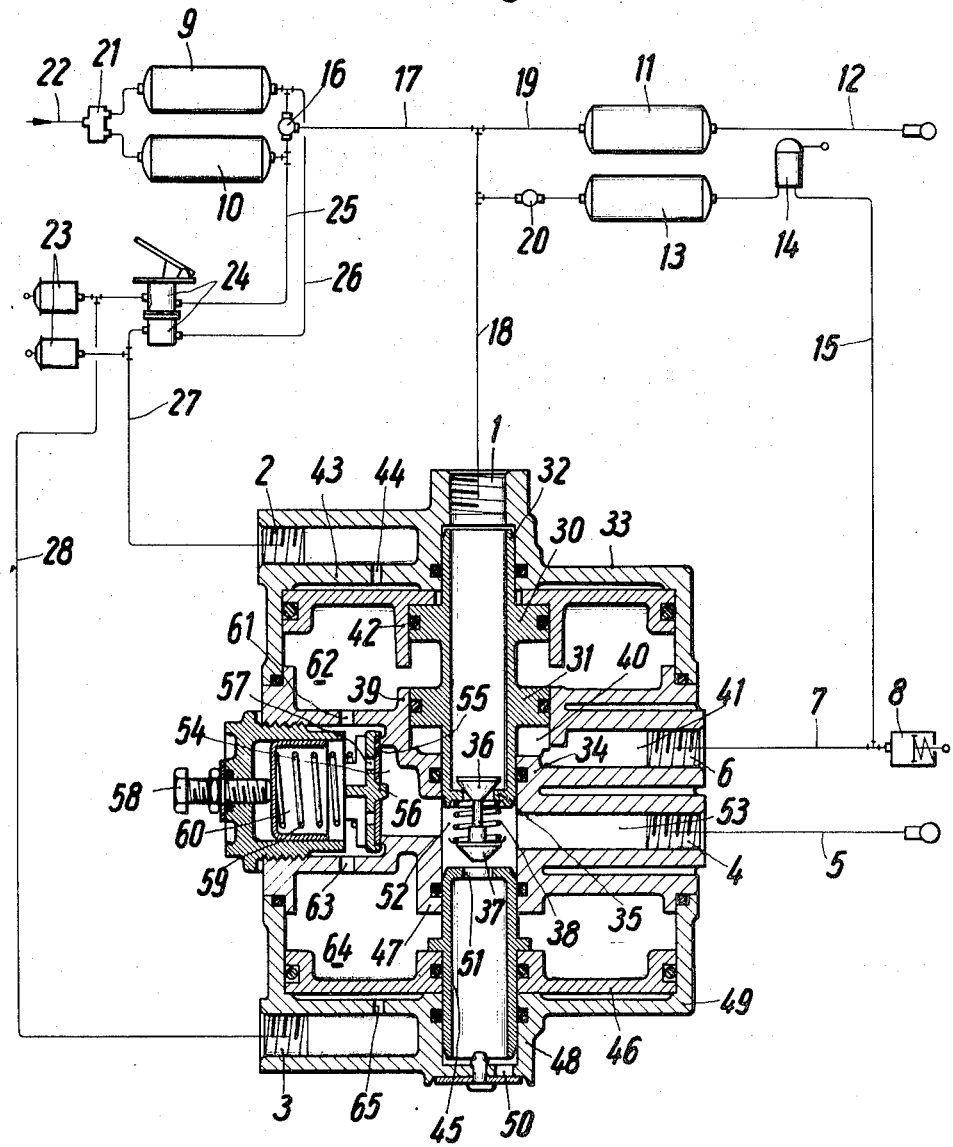
FIG. 1 is a schematic axial section of the two circuit brake arrangement with the pressure safety relay designed in accordance with the present invention.

Referring now to the drawings, the pressure safety relay, in accordance with the present invention, comprises a unit closed in itself with the connection 1 for the storage air, the two connections 2 and 3 for the two brake circuits, the trailer connection 4 for the brake conduit 5 to the trailer and the connection 6 for a control conduit 7 to a spring storage cylinder 8.

The two pressurized air storage containers 9 and 10, respectively, for the individual brake circuits and furthermore the storage containers 11 for the trailer storage conduit 12 and containers 13, respectively, for the conduit 15 leading over the hand brake valve 14 to the spring storage cylinder 8 preset in the truck. The two storage containers 9 and 10 are connected by means of a pressure control valve 16 and a conduit 17 and 18, respectively, to the connection 1 of the relay valve. The same applies also for the two storage containers 11 and 13, which are connected by means of the conduit 18 over a conduit 19 and an overflow valve 20, respectively. The two storage containers 9 and 10 are connected by means of a multi-circuit protection valve 21 to the pressurized air feeding conduit 22.

The braking cylinders 23 are connected with a two-circuit foot plate brake valve 24, which is connected by means of the conduits 25 and 26, respectively, to the storage container 9 and 10, respectively, and over the conduits 27 and 28, respectively, to the two brake conduit connections 2 and 3, respectively, of the pressure safety relay. In the housing receiving the pressure safety relay are provided for opposite movement relative to each other two step piston arrangements. The step piston arrangement coordinated to the storage connection 1 comprises substantially a double piston 30 and 31, which sit on a common hollow piston rod 32, which guides itself sealingly, on the one hand, in the housing cover 33 carrying the connections 1 and 2 and, on the other hand, in the housing center member 34.

The hollow piston rod 32, which is in open connection with the storage connection 1, has at its lower end an inlet seat 35 and carries a double valve formed of the two valve bodies 36 and 37, whch double valve is engaged by a valve spring 38.

With the piston part 31, the piston arrangement guides itself in a cylindrical guide 39 of the housing center member 34, whereby a ring chamber 40 is formed below the piston part 31, which ring chamber 40 is in open connection with a chamber 41, which leads to the connection 6.

On the other hand, a control piston 43 guides itself on the piston part 30 by means of a cylindrical guide 42, which control piston 43 guides itself in its outer periphery in the cylindrically designed housing cover 33.

A cylinder chamber 43' disposed above the control piston 43 is connected with the brake conduit connection 2 by means of a connecting bore 44 with the brake conduit connection 2.

The piston arrangement operating in reciprocating manner against the mentioned step piston comprises a hollow piston rod 45, on which a further control piston 46 guides itself. On the other hand the hollow piston rod 45 is retained sealingly in a cylinder guide 47 of the housing center member 34 and in a further guide 48 of the lower housing cover 49.

The hollow piston rod 45 is at its lower end in open connection with the airing connection 50. At the upper end it forms a valve seat 51 for the part 37 of the double valve body 36 and 37.

In the housing center member 34 a so-called valve chamber 52 is formed between the two piston arrangements, which valve chamber 52 is connected by means of a bore 53 with a connection 4 of the trailer brake conduit valve.

A further chamber 54 is in open connection with the valve chamber 52, which chamber 54 is transformed into a seat 55 for a plate valve 56. The plate valve 56 equipped with the bores 57 is engaged by a spring 59 settable as to its load by means of a screw 58, whereby the space 60 formed above the plate valve 56 is connected with the piston chamber 62 formed below the control piston 43 and by means of the bore 63 with the piston chamber 64 formed above the control piston 46.

All parts of the pressure safety relay, shown in FIG. 1, are indicated in operative position. The pressurized air storage is above the connection 1 on the closed valve 36 of the hollow piston rod 32. The trailer-brake conduit 5 is aired by means of the bore 53, the valve chamber 52, the opened valve 37 and 51, the hollow piston rod 45 and the airing valve 50.

The space disposed above the control piston 43 is aired through the passage 44, the connection 2 and the conduit 27 by means of the foot plate valve 24. The same applies also for the chamber disposed below the piston 46, which is connected by means of the bore 65, the connection 3 and the conduit 28 with the foot plate valve 24. Accordingly also the brake cylinders 34 are aired.

Simultaneously the storage air from the container 13 acts upon the hand brake valve 14 on the spring storage 8, which is accordingly released. On the other hand, the storage air container 13 is connected by means of the conduit 7, the connection 6, the bore 41 and the ring chamber 40, the lower side of the piston part 31 of the upper step piston arrangement.

In case of a brake operation, by pushing down the foot brake plate valve 24, storage air is fed in both brake circuits to the brake cylinders 23. Simultaneously storage air is fed by the conduit 27 and the connection 2 to the upper side of the control piston 43 and by means of the conduit 28 and the connection 3 to the lower side of the control piston 46. Both pistons move towards each other. By this arrangement finally the outlet valve 51 and 37 is closed and the inlet valve 35 and 36 is opened. By this arrangement the storage air can flow by means of the valve chamber 52 and the bore 33 and the connection 4, respectively, and the trailer brake conduit 5 from here to the trailer control valve.

Simultaneously the storage air can also enter into the valve chamber 54.

In case of a predetermined pressure increase, the plate valve 56 is lifted against the force of the spring 59 from its seat 55, so that now the pressure can be exerted in the chamber 62 on the under side of the control piston 43 and in the chamber 64 on the upper side of the piston 46. By this arrangement a brake connection position is obtained, that means both piston arrangements move backward again until the inlet 36 and 35 is closed again and the outlet 51 and 37 remains closed. If additional pressure is applied up to the full braking the pistons move towards each other again, until a pressure balance between both brake circuits 27 and 28 and the trailer brake conduit 5 is obtained.

In case one of the two brake circuits 27 and 28, respectively, falls out, the coordinated step piston 43 and 46, respectively, returns to its starting position. The piston, which is coordinated to the operating circuit, follows the other piston, so that the outlet seat 37 and 51 is closed and the inlet seat 36 and 35 is opened. By this arrangement it is assured, that in each case the trailer brake conduit 5 is fed with pressurized air and thus the trailer brake remains fully effective.

In case a braking should take place by means of the manual brake valve 14 for the spring storage 8, also without operation of the foot plate valve 24, the spring storage 8 as well as the chamber 41 of the pressure safety relay are aired. The storage pressure effective in the hollow piston rod 32 permits that the piston arrangement 30 and 31 is travelling downwardly so far without the control piston 43 until the inlet valve 35 and 36 opens and the outlet valve 51 and 37 closes and storage air can reach over the trailer brake conduit 5 to the trailer control valve. In this case also the two cylindrical chambers 62 and 64 can be engaged with pressurized air, the control pistons 43 and 46 remain in and reach, respectively, their starting positions.

If the brake is released by means of the hand brake valve 14, the spring storage cylinder 8 is fed with pressurized air and likewise also the ring chamber 40 of the pressure safety relay, so that the piston arrangement 31 and 30 is moved upwardly. The inlet valve is closed and the outlet valve is open, so that the trailer brake conduit 5 is aired. Simultaneously the airing of the valve chamber 54 takes place. Due to the over pressure in the cylinder chambers 62 and 64, the sealing disk elastically covering the bores 57 of the plate valve 56 are lifted, so that the pressurized air can escape from the chambers 62 and 64 by means of the bores 63 and 61, respectively, and through the plate valve 56 and 57.

Upon release of the operating brake practically the same procedure is required.

Figure 2:
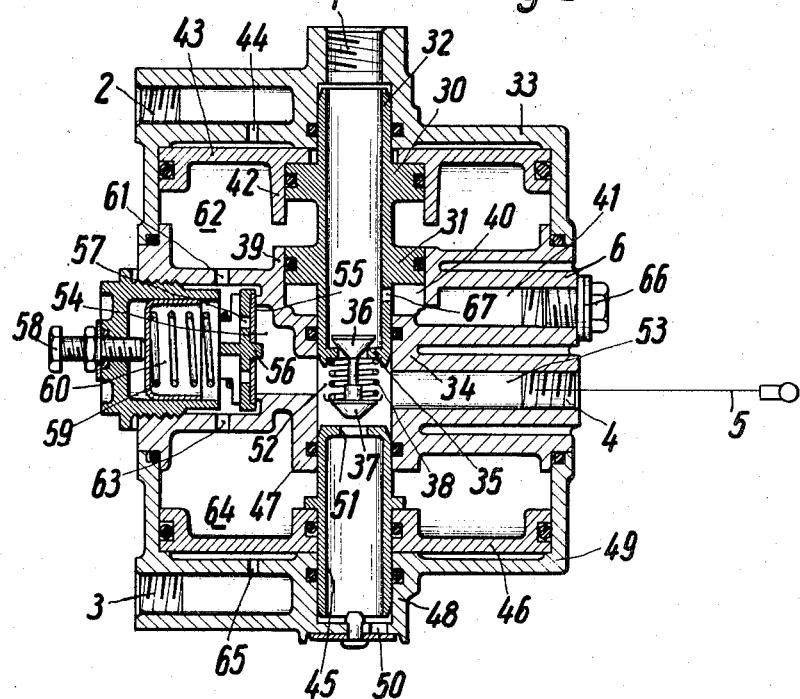
FIG. 2 is an axial section through the pressure safety relay disclosed in FIG. 1 in its application without a spring storage cylinder for the auxiliary or setting brake.
Figure 3:
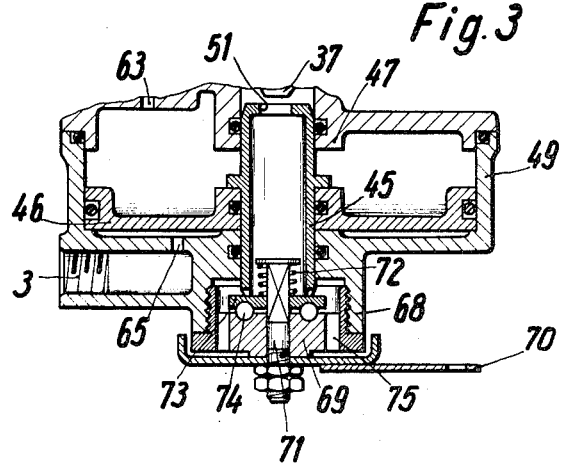
FIG. 3 is a fractionary section through the pressure safety relay by connection of the latter to a purely mechanically operated securing and auxiliary brake, respectively.

In brake arrangements without spring storage means in accordance with FIG. 2, the overflow valve 20, the storage container 13, the hand brake valve 14 and the spring storage 8 are eliminated. The connection 6 of the pressure safety relay is then closed by the closing screw 66. Below the piston 31 is provided the hollow piston rod 32 with a bore 67. The bore 67 permits an engagement of the lower side of the piston 31 with storage air, so that the piston 30 and 31 is retained in its starting position. The function of the relay upon operation of the brake is then the same, as has been described above.

In case of the presence of a purely mechanically operated securing brake, an insert 69 can be screwed in a threaded insert 68 of the housing cover 49, which insert 69 forms the support for a setting spindle 71 to be operated by means of a manual hand lever connection 70. On the setting spindle 71 sits, biased by a spring 72, non-rotatably a setting plate 73, which supports itself with resting members over balls 74 on the bearing member 69. Upon rotation of the rods forming part of the mechanical brake and of the lever 70, respectively, and thereby of the spindle 71, the plate 73 reaches with its resting members over the balls 74, so that thereby an axial displacement of the plate 73 and a lifting of the lower piston arrangement 45 takes place, and in particular so far, until the outlet valve 51 and 37 are closed and the inlet valve 35 and 36 is opened. By this arrangement the above-described pressurized air engagement of the trailer brake conduit takes place. The mechanical braking rod is returned again into its starting position, a new airing through the passage bores 75 can take place.

While we have disclosed several embodiments of the present invention, it is to be understood that these embodiments are given by example only and not in a limiting sense.

We claim:

1. A two-circuit brake arrangement for trucks for drawing of trailers braked by pressurized air, comprising
    two brake circuits,
    a common pressure safety relay,
    said two brake circuits being connected with said common pressure safety relay,
    a common housing,
    two oppositely operating control piston arrangements disposed in said common housing,
    said control piston arrangements movable in cylindrical guides,
    a central valve chamber including a connection for a brake conduit for a trailer,
    said cylindrical guides extending into said central valve chamber,
    said control pistons being hollow,
    two step pistons disposed in said brake arrangement, one of said step pistons having an inlet seat and the other of said step pistons having an outlet seat within the range of said valve chamber for a spring biased double valve body,
    said double valve body closing said inlet seat,
    said step piston carrying said inlet seat defining inner spaces,
    said inner space of said step piston carrying said inlet seat being in communication with a storage air connection,
    said other of said step pistons defining an inner space and being in open communication with an airing connection,
    said cylindrical guides receiving said step pistons carrying each a brake circuit connection on the outside of said pistons and being in communication on the other side with said valve chamber by means of a passage, and
    another spring-biased valve separating the part of said valve chamber receiving said double valve body and said brake conduit connection from the part of said valve chamber terminating the passages leading to said cylindrical guides.

2. The two-circuit brake arrangement, as set forth in claim 1, wherein
    said another valve includes a spring, and
    means for controlling from the outside said spring in its tension for setting a pressure advance for the trailer braking.

3. The two-circuit brake arrangement as set forth in claim 1, wherein
    said step piston carrying said inlet seat includes an additional step extending into said valve chamber and defining a ring chamber jointly with said common housing,
    said additional step operating in said ring-chamber, and
    said ring-chamber is in communication with an air storage connection included in a spring storage brake by means of a conduit.

4. The two-circuit brake, as set forth in claim 3, which includes
    an operation valve disposed in said conduit between said ring-chamber and said storage container, and
    a spring storage is connected with said conduit.

5. The two-circuit brake, as set forth in claim 3, wherein
    said conduit between said ring-chamber and said storage conduit comprises a bore passing the inner wall of said step piston carrying said inlet seat, adapted to be used upon removal of a spring storage cylinder.

6. The two-circuit brake, as set forth in claim 1, which includes
    said step pistons comprising at least two independent piston members,
    one part of each of said control pistons in sealingly engaged with said common housing and said step pistons, and
    abutment means operative toward one side only are provided between both of said piston parts so that the large piston part forces said hollow piston to said valve chamber upon application of pressure.

7. The two-circuit brake, as set forth in claim 6, which includes
    a mechanical operating device connected with a manual brake rod for said step piston carrying said outlet seat.

References Cited
UNITED STATES PATENTS

| | | | |
|---|---|---|---|
| 3,261,645 | 7/1966 | Alfieri et al. | 303—7 |
| 3,272,564 | 9/1966 | Romanini | 303—13 |
| 3,275,381 | 9/1966 | Pfeifer | 303—7 |
| 3,504,946 | 4/1970 | Valentine et al. | 303—13 |

MILTON BUCHLER, Primary Examiner

J. J. McLAUGHLIN, Assistant Examiner

U.S. Cl. X.R.

188—3; 303—40